United States Patent
Park et al.

(10) Patent No.: US 12,128,839 B2
(45) Date of Patent: Oct. 29, 2024

(54) VEHICLE AND METHOD OF CONTROLLING THE SAME

(71) Applicants: Hyundai Motor Company, Seoul (KR); Kia Corporation, Seoul (KR)

(72) Inventors: Youngjae Park, Hwaseong-si (KR); Jaemin Joh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 307 days.

(21) Appl. No.: 17/491,909

(22) Filed: Oct. 1, 2021

(65) Prior Publication Data

US 2022/0118926 A1     Apr. 21, 2022

(30) Foreign Application Priority Data

Oct. 21, 2020 (KR) .................. 10-2020-0136454

(51) Int. Cl.
*G10L 15/22* (2006.01)
*B60R 16/037* (2006.01)

(52) U.S. Cl.
CPC .......... *B60R 16/0373* (2013.01); *G10L 15/22* (2013.01); *G10L 2015/223* (2013.01)

(58) Field of Classification Search
CPC ... G10L 15/22; G10L 2015/223; G10L 15/30; B60R 16/0373
See application file for complete search history.

(56) References Cited

U.S. PATENT DOCUMENTS

| | | | |
|---|---|---|---|
| 10,885,091 B1 * | 1/2021 | Meng | G06F 16/24578 |
| 2004/0193420 A1 * | 9/2004 | Kennewick | G06F 16/3329 |
| | | | 704/270.1 |
| 2008/0103781 A1 * | 5/2008 | Wasson | G10L 17/26 |
| | | | 704/E15.04 |
| 2009/0318777 A1 * | 12/2009 | Kameyama | G01C 21/3608 |
| | | | 704/251 |
| 2010/0185445 A1 * | 7/2010 | Comerford | G10L 15/06 |
| | | | 704/E15.001 |
| 2014/0278436 A1 * | 9/2014 | Khanna | G10L 21/00 |
| | | | 704/275 |

(Continued)

FOREIGN PATENT DOCUMENTS

KR       20190133962 A       12/2019

*Primary Examiner* — Mark Villena
(74) *Attorney, Agent, or Firm* — SLATER MATSIL, LLP

(57) ABSTRACT

An embodiment vehicle includes a communication device, an output device, an input device including a microphone, and a control device connected to each. The control device is configured to transmit speech data received through the microphone to a server through the communication device, to receive analysis information of the speech data from the server through the communication device in response to the transmission of the speech data, to identify whether the speech data corresponds to a first speech command registered in the server based on the analysis information, to control the output device to output information about target devices of a control setting of the vehicle based on the speech data not corresponding to the first speech command, and to set the speech data as a second speech command for controlling at least one of the target devices based on a reception of a user input through the input device.

16 Claims, 7 Drawing Sheets

(56) References Cited

U.S. PATENT DOCUMENTS

| | | | |
|---|---|---|---|
| 2018/0061410 A1* | 3/2018 | Biswal | G10L 15/063 |
| 2019/0013010 A1* | 1/2019 | Kokubo | G10L 15/187 |
| 2019/0019516 A1* | 1/2019 | Van Hoecke | G10L 15/22 |
| 2019/0378515 A1* | 12/2019 | Kim | G10L 17/22 |
| 2020/0135190 A1* | 4/2020 | Kaja | G06V 20/593 |
| 2020/0324785 A1* | 10/2020 | Sedaghat | G06V 20/59 |
| 2021/0347328 A1* | 11/2021 | Bhattacharya | G05B 13/027 |

\* cited by examiner

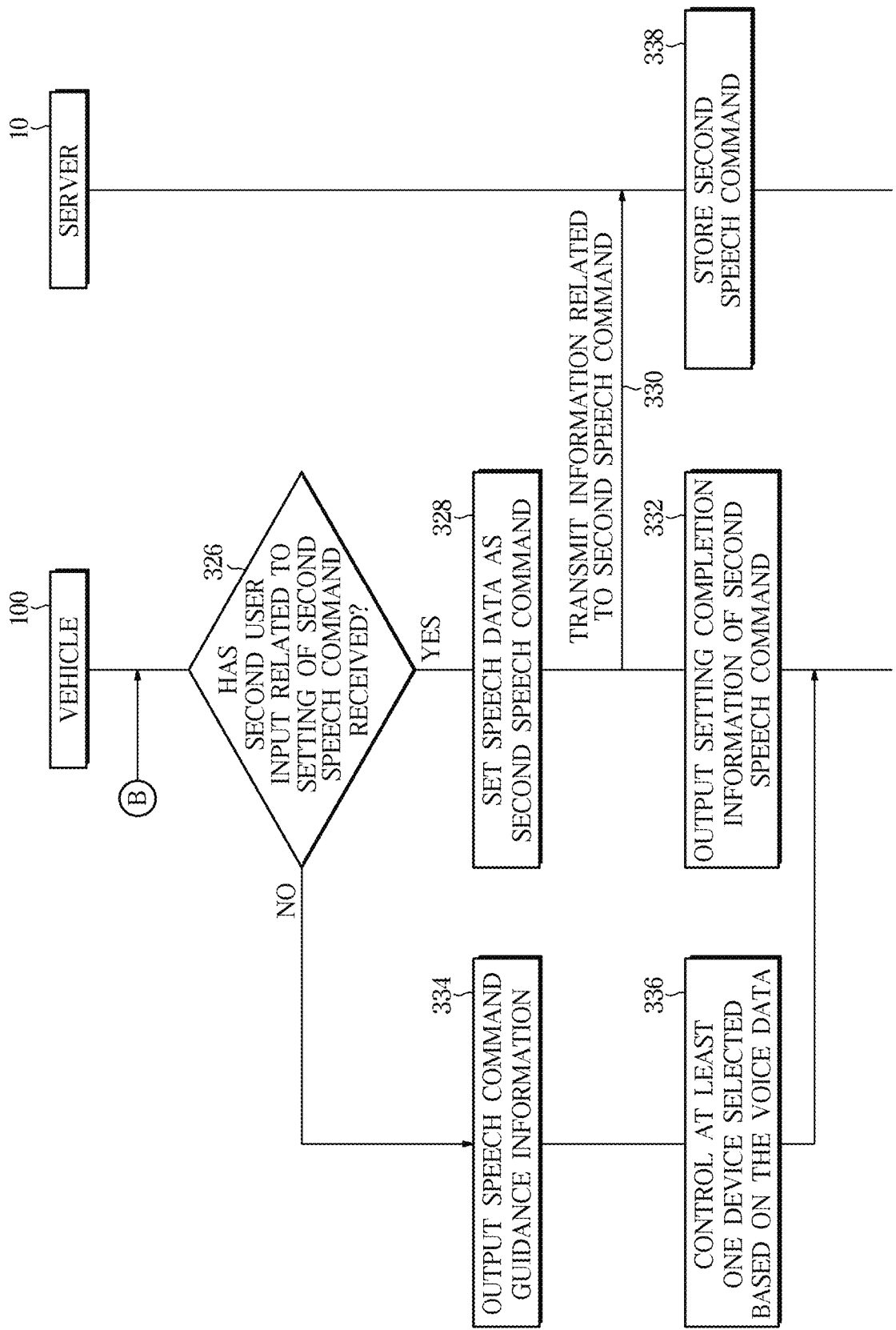

VEHICLE AND METHOD OF CONTROLLING THE SAME

CROSS-REFERENCE TO RELATED APPLICATIONS

This application claims the benefit of Korean Patent Application No. 10-2020-0136454, filed on Oct. 21, 2020, which application is hereby incorporated herein by reference.

TECHNICAL FIELD

The disclosure relates to a vehicle and a method of controlling the vehicle.

BACKGROUND

A speech recognition technology is a field that has been studied for a long time, starting with a development of a numeric recognizer jointly developed by AT&T and Bell Labs in the United State in 1950, and developing a mobile phone with a simple speech recognition function. Until now, the speech recognition technology has been continuously developed, and a speech recognition rate has rapidly improved.

The speech recognition technology is recently installed as a basic function of a vehicle, so that a driver of the vehicle can use various functions of the vehicle while driving. For example, through the driver's speech recognition, the vehicle can control a window, a trunk, an air conditioner, a heated seat and/or a ventilation seat of the vehicle.

However, a conventional speech recognition technology in the vehicle does not recognize terms that are used differently for each driver, and can only recognize a predetermined speech command, and thus has a disadvantage of poor usability.

In addition, the conventional speech recognition technology in the vehicle simply outputs a guide sound related to an operation of the vehicle, and thus has a disadvantage in that it is not possible to confirm the operation of the vehicle.

SUMMARY

An aspect of the disclosure is to provide a vehicle capable of providing a speech recognition technology that can be linked with a graphical user interface (GUI) and to which a learning function for customization is applied, and a method of controlling the vehicle.

For example, the vehicle may provide a user-customized speech recognition function to increase the usability and clarity of the speech recognition function compared to a prior art. Accordingly, it is possible to increase the convenience of a user, for example, a driver.

Additional aspects of the disclosure will be set forth in part in the description which follows and, in part, will be obvious from the description, or may be learned by practice of the disclosure.

According to an aspect of the disclosure, there is provided a vehicle including: a communication device; an output device; an input device including a microphone; and a control device connected to the communication device, the output device, and the input device. The control device may be configured to transmit speech data received through a microphone to a server through the communication device, to receive analysis information of the speech data from the server through the communication device in response to the transmission of the speech data, to identify whether the speech data corresponds to a first speech command registered in the server based on the analysis information, to control the output device to output information about target devices of a predetermined control setting of the vehicle based on the speech data not corresponding to the first speech command, and to set the speech data as a second speech command for controlling at least one of the target devices based on a reception of a user input through the input device.

The control device may be configured to output information related to the first speech command through the output device based on the speech data corresponding to the first speech command, and to control the devices of the vehicle based on the first speech command.

The vehicle may further include a storage device. The control device may be configured to, based on the speech data not correspond to the first speech command, identify whether the speech data is registered in advance and corresponds to a third speech command stored in the storage device, and to control the output device to output information about the target devices of the predetermined control setting based on the speech data not corresponding to the third speech command.

The control device may be configured to receive a first user input through the input device in response to the output of information about the target devices, to identify the at least one of the target devices based on the reception of the first user input, and in response to the identification of the at least one device, to control the output device to output user selection information about whether to set the speech data as the second speech command for controlling the at least one device.

The control device may be configured to receive a second user input through the input device in response to the output of the selection information, and to set the speech data as the second speech command for controlling the at least one device based on the second user input.

The control device may be configured to output information related to the third speech command through the output device based on the speech data corresponding to the third speech command, and to control the device of the vehicle based on the third speech command.

The control device may be configured to control the at least one device based on the second speech command.

The control device may be configured to transmit information related to the second speech command to the server through the communication device.

According to another aspect of the disclosure, there is provided a method of controlling a vehicle including: transmitting, by a control device, speech data received through a microphone of the vehicle to a serve; receiving, by the control device, analysis information of the speech data from the server in response to the transmission of the speech data; identifying, by the control device, whether the speech data corresponds to a first speech command registered in the server based on the analysis information; controlling, by the control device, an output device of the vehicle to output information about target devices of a predetermined control setting of the vehicle based on the speech data not corresponding to the first speech command, and setting, by the control device, the speech data as a second speech command for controlling at least one of the target devices based on a reception of a user input.

The method may further include outputting, by the control device, information related to the first speech command through the output device based on the speech data corresponding to the first speech command; and controlling, by the control device, the devices of the vehicle based on the first speech command.

The controlling of the output device of the vehicle to output the information about the target devices of the predetermined control setting of the vehicle may include, based on the speech data not correspond to the first speech command, identifying whether the speech data is registered in advance and corresponds to a third speech command stored in the storage device; and controlling the output device to output information about the target devices of the predetermined control setting based on the speech data not corresponding to the third speech command.

The setting of the speech data as the second speech command for controlling the at least one of the target devices may include receiving a first user input through the input device in response to the output of information about the target devices; identifying the at least one of the target devices based on the reception of the first user input; and in response to the identification of the at least one device, controlling the output device to output user selection information about whether to set the speech data as the second speech command for controlling the at least one device.

The setting of the speech data as the second speech command for controlling the at least one of the target devices may include receiving a second user input in response to the output of the selection information; and setting the speech data as the second speech command for controlling the at least one device based on the second user input.

The method may further include outputting, by the control device, information related to the third speech command through the output device based on the speech data corresponding to the third speech command; and controlling, by the control device, the device of the vehicle based on the third speech command.

The method may further include controlling, by the control device, the at least one device based on the second speech command.

The method may further include transmitting, by the control device, information related to the second speech command to the server.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 3A, 3B and 3C are flowcharts illustrating an operation of a vehicle according to an embodiment;

DETAILED DESCRIPTION OF ILLUSTRATIVE EMBODIMENTS

Figure 1:
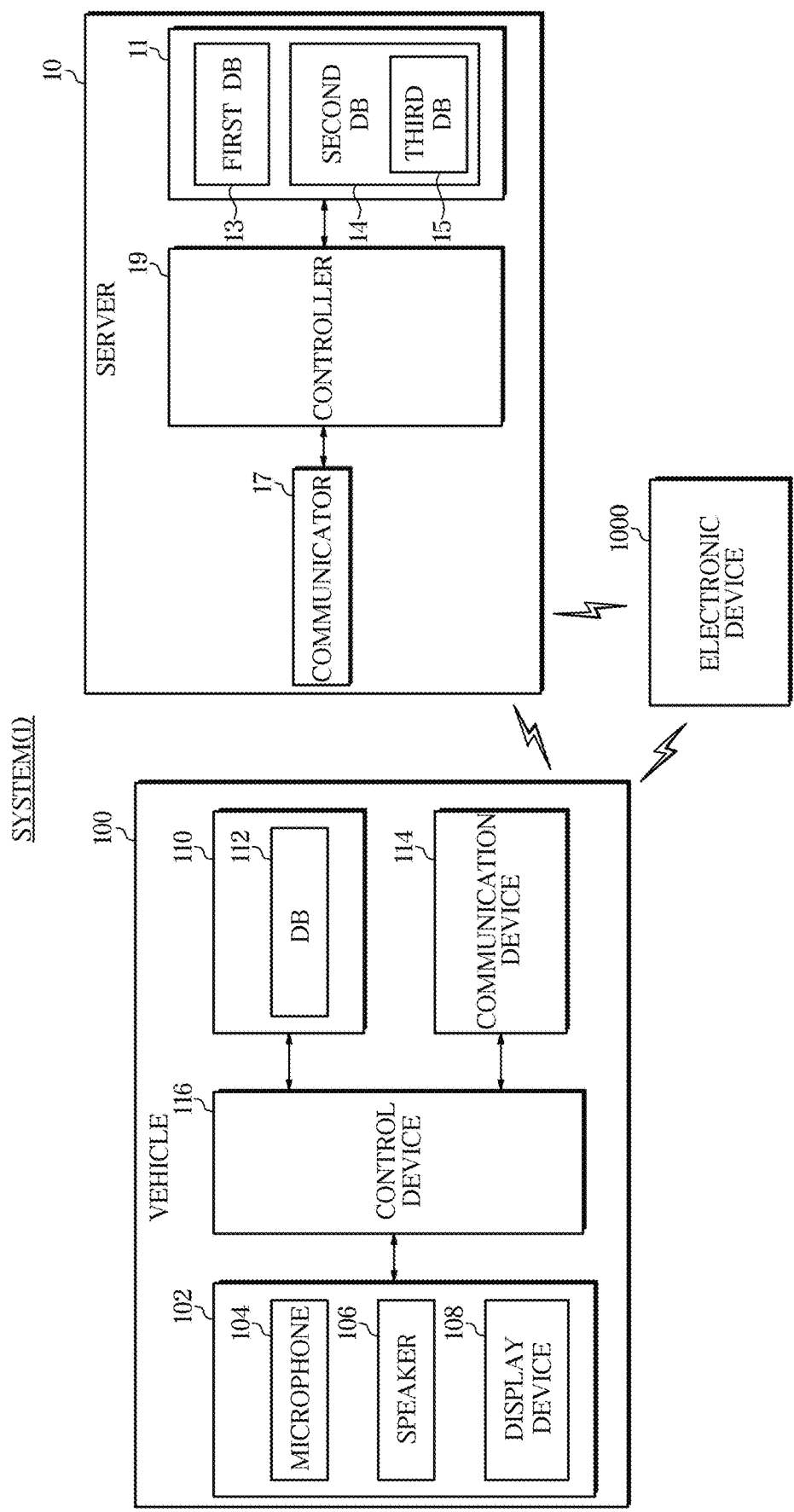
FIG. 1 is a block diagram of a system including a server, a vehicle, and an electronic device according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

FIG. 1 is a block diagram of a system including a server, a vehicle, and an electronic device according to an embodiment.

Referring to FIG. 1, a server 10 may include a storage 11, a communicator 17 and/or a controller 19.

The storage 11 may store a variety of data used by at least one component (communicator 17 and/or controller 19) of the server 10, for example, input data or output data for a software program and instructions related thereto. The storage 11 may include a memory, for example, a volatile memory and/or a non-volatile memory.

The storage 11 may include a first database 13 and a second database 14.

The first database 13 may store at least one first speech command.

The first speech command may include an official speech command registered in advance so as to control (and/or control at least one function) at least one device of a vehicle 100 and another vehicle. For example, the first speech command may include the official speech command (or also referred to as a representative speech command) basically set when the software program of the vehicle 100 is installed.

In addition, some of third speech commands that meet a predetermined reference among the third speech commands stored in the second database 14 to be described later may be registered as the first speech command, which is the official speech command, according to a control of the controller 19.

For example, when a usage rate used by users of a plurality of vehicles communicating with the server 10 is greater than or equal to a reference rate (e.g., 10%), it may be said that the predetermined reference is satisfied. According to this, among the third speech commands stored in the second database 14, the third speech commands having the usage rate of more than the reference rate used by users of the plurality of vehicles communicating with the server 10 may be registered as first speech commands.

In addition, in some third speech commands that satisfy the predetermined reference based on an algorithm that filters abusive language, hate expression and/or advertisements under the control of the controller 19, the speech commands including the abusive language, the hate speech, and/or the advertisements are filtered (or excluded), and the remaining third speech commands may be registered as the first speech commands, which are official speech commands.

The second database 14 may store third speech commands set by a plurality of users, for example, drivers and registered in advance. For example, the server 10 may receive the third speech commands from the plurality of vehicles through the communicator 17 and store them in the second database 14. For example, the second database 14 may store the third speech commands by classifying each of the plurality of vehicles (and/or the plurality of drivers).

The third speech command may include the speech command set in advance and registered by the plurality of users of the vehicle 100 and other vehicles, for example, the drivers, so as to control (and/or control at least one function) at least one device of the vehicle 100 and the other vehicles.

The second database 14 may include a third database 15.

The third database 15 may store the third speech commands set by the vehicle 100 and registered in advance.

The third database 15 may store at least one second speech command received from the vehicle 100. For example, the server 10 may receive the at least one second speech command from the vehicle 100 through the communicator 17 and store it in the second database 14.

The second speech command may be the speech command set based on the control of a control device 116 of the vehicle 100 so as to control (and/or control at least one function) the at least one device of the vehicle 100.

For example, the second speech command and the third speech command may be referred to as a user-set speech command or a variant speech command.

The communicator 17 (or also referred to as a communication circuit or communication device) may support establishing a wired communication channel between the server 10 and an external device, for example, the vehicle 100 and/or an electronic device 1000 and performing communication through the established communication channel. For example, the communicator 17 may include a wireless communication module (e.g., a cellular communication module, a Wi-Fi communication module, a short-range wireless communication module, or a global navigation satellite system (GNSS) communication module) to communicate with the external device. The communicator 17 may include the communication circuit.

The controller 19 (also referred to as a control circuit or a processor) may control at least one other component of the connected server 10 (e.g., the hardware component (e.g., storage 11 and/or communicator 17)) or the software component (software programs)), and may perform various data processing and operations. The controller 19 may include the processor and the memory.

The controller 19 may cause the server 10 to synchronize with the vehicle 100 and the other vehicles.

For example, the controller 19 may receive the second speech command that is the user-set speech command from the vehicle 100 through the communicator 17 and store the second speech command in the storage 11. The controller 19 may transmit the first speech command, which is the official speech command stored in the storage 17, to the vehicle 100 through the communicator 17. The controller 19 may transmit the third speech command that is the user-set speech command stored in the storage 17 through the communicator 17 to the vehicle 100 and the other vehicles.

The controller 19 may register and/or store the third speech command frequently used in the vehicle 100 and the other vehicles as the first speech command, which is the official speech command.

The controller 19 may cause the server 10 to synchronize with the electronic device 1000.

For example, the controller 19 may receive the second speech command that is the user-set speech command from the electronic device 1000 through the communicator 17 and store the second speech command in the storage 11.

The controller 19 may receive information about the modification or deletion of the second speech command and/or the third speech command, which is the user-set speech command, from the electronic device 1000 through the communicator 17, and may modify or delete the second speech command and/or the third speech command stored in the.

The controller 19 may transmit the first speech command that is the official speech command stored in the storage 17 to the electronic device 1000 through the communicator 17. The controller 19 may transmit the third speech command that is the user-set speech command stored in the storage 17 to the electronic device 1000 through the communicator 17.

The vehicle 100 may include an input and output device 102, a storage device 110, a communication device 114 and/or the control device 116.

The input and output device 102 may include a microphone 104, a speaker 106 and/or a display device 108.

The microphone 104 may receive a sound, for example, a speech of a passenger of the vehicle 100, and may change the received sound into an electrical signal.

The speaker 106 may convert the electrical signal into the sound and output the sound.

The display device 108 may display, for example, various types of content (e.g., text, images, videos, icons, and/or symbols). The display device 108 may include a touch screen, and may receive, for example, a touch, a gesture, a proximity, or a hovering input using a part of the user's body.

The input and output device 102 may include an audio, video, navigation, telematics (AVNT) device of the vehicle 100. For example, the speaker 106 and/or the display device 108 may be included in the AVNT device of the vehicle 100. The AVNT device may refer to a multimedia device in which audio, video, navigation and/or telematics terminals are integrated into one. The AVNT device may be provided on a center fascia of the vehicle 100, but is not limited thereto.

The storage device 110 may store a variety of data used by at least one component (communicator 17 and/or controller 19) of the vehicle 100, for example, input data or output data for the software program and instructions related thereto. The storage device 110 may include the memory, for example, the volatile memory and/or the non-volatile memory.

The storage device 110 may include a database 112.

The database 112 may store at least one third speech command set by the driver of the vehicle 100 and registered in advance. The third speech command may control (and/or control at least one function) the at least one device of the vehicle 100.

The database 112 may store the second speech command that is set based on a control of the control device 116. The second speech command may control (and/or control at least one function) the at least one device of the vehicle 100.

The database 112 may be updated when the vehicle 100 is started and/or the software program related to the operation of the vehicle 100 is booted.

For example, when the vehicle 100 is started and/or the software program related to the operation of the vehicle 100 is booted, the control device 116 may receive information related to at least one third speech command stored in the third database 15 from the server 10 communicated with the vehicle 100. The control device 116 may update information stored in the database 112, that is, the third speech commands stored in the database 112, based on information related to the received at least one third speech command.

The communication device 114 may support establishing the wired and/or wireless communication channel between the vehicle 100 and the external device, for example, the server 10 and/or the electronic device 1000, and may perform communication through the established communication channel. The communication device 114 may include the communication circuit. For example, the communication device 114 may include the wireless communication module (e.g., the cellular communication module, the Wi-Fi communication module, the short-range wireless communication module, or the GNSS communication module) and/or the wired communication module, and may communicate with the external device using a corresponding communication module.

The communication device 114 may include a controller area network (CAN) communication circuit (also referred to as a CAN transceiver) that communicates with at least one component (input and output device 102, storage device 110 and/or control device 116) of the vehicle 100 via a communication network for the vehicle 100, that is, for transmitting and receiving signals, and a control circuit (or also referred to as the control device) for controlling an operation of the CAN communication circuit.

The control device 116 (also referred to as the control circuit or the processor) may control at least one other component of the vehicle 100 (e.g., the input and output device 102, the storage device 110 and/or the communication or the software component (software program)), and may perform various data processing and operations.

The control device 116 may include an electronic control unit (ECU) that controls a power system of the vehicle 100.

The control device 116 may include the processor and the memory.

The control device 116 may recognize and classify the speech command capable of controlling the vehicle 100 among speeches uttered by the driver of the vehicle 100. For example, the control device 116 may recognize, classify, and/or register speech data received through the microphone 104 as the speech command.

The control device 116 may control the speaker 106 and/or the display device 108 to audibly or visually output information related to the speech command.

The control device 116 may perform a recommended operation so that the user's speech data similar to the first speech command capable of controlling the vehicle 100 can be registered as the second speech command.

The control device 116 may register and/or modify the second speech command.

When registering the second speech command, the control device 116 may transmit information about the second speech command to the server 10.

The electronic device 1000 may be a variety of devices such as a mobile phone and/or a smart phone including a memory (not shown), a communicator (not shown), an input device (not shown), an output device (not shown), and/or a controller (not shown).

The software program related to the speech command of the vehicle 100 may be stored in the memory of the electronic device 1000. For example, the software program related to the speech command may include an application program capable of registering, modifying and/or deleting the speech command of the vehicle 100.

The controller of the electronic device 1000 may control the communicator so that the electronic device 1000 communicates with the vehicle 100 and/or the server 10, and may receive Information about the first speech command, the second speech command, and/or the third speech command from the vehicle 100 and/or the server 10.

The controller of the electronic device 1000 may set, register, modify, and/or delete the speech command based on reception of a user input through the input device. The controller of the electronic device 1000 may transmit information related to a control operation to the vehicle 100 and/or the server 10 so that the setting, registration, modification and/or deletion of the speech command is directly reflected on the vehicle 100 and/or the server 10.

Figure 2:
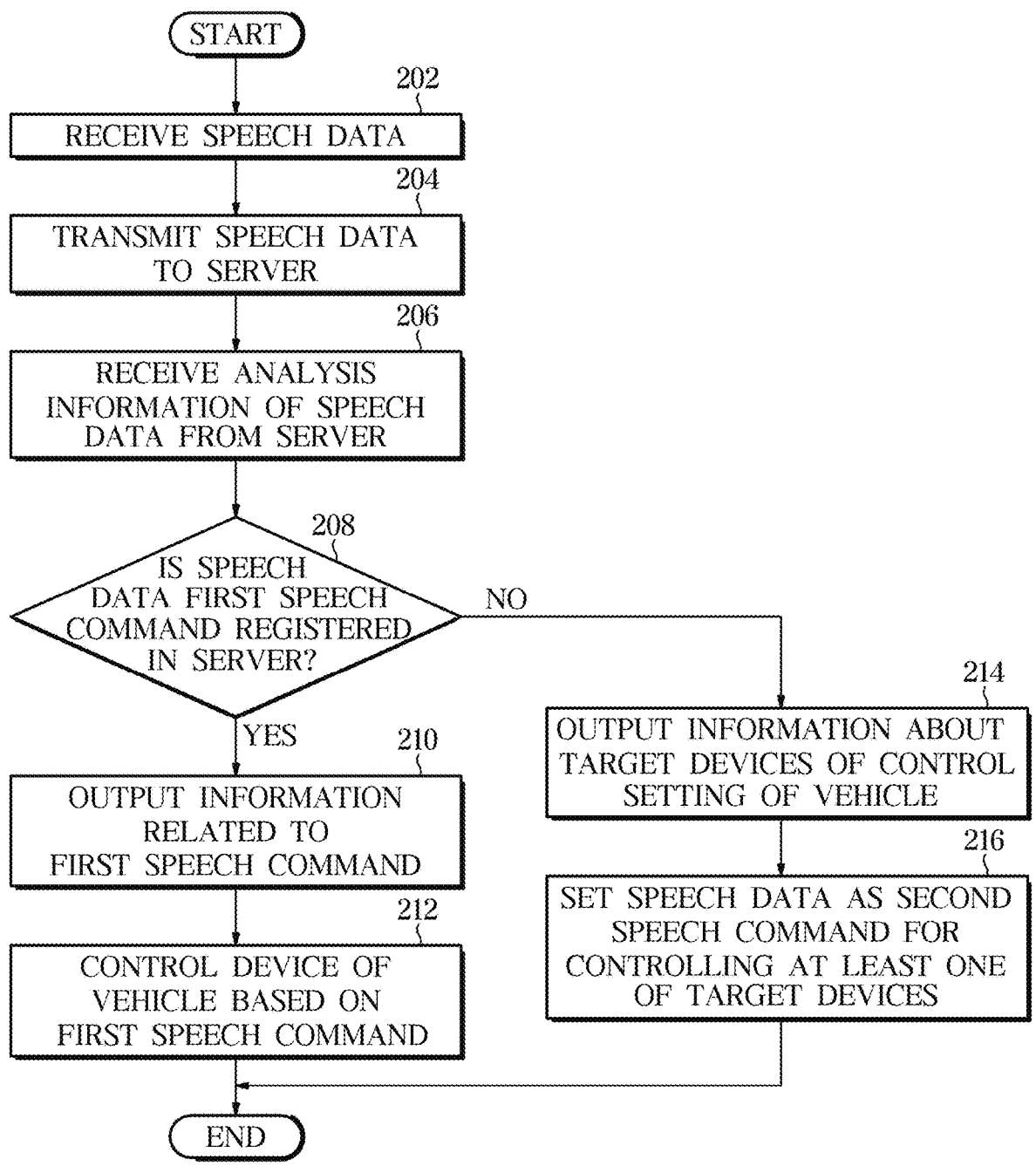
FIG. 2 is a flowchart illustrating an operation of a vehicle according to an embodiment.

FIG. 2 is a flowchart illustrating an operation of a vehicle according to an embodiment.

The vehicle 100 may receive the speech data of the user through the microphone 104 (202).

The vehicle 100 may transmit the speech data to the server 10 through the communication device 114 (204).

For example, the vehicle 100 may identify whether the speech data is related to the control of the vehicle 100 based on speech recognition technology and/or natural language recognition technology. When the speech data is related to the control of the vehicle 100, the vehicle 100 may transmit the speech data to the server 10.

In response to the transmission of the speech data, the vehicle 100 may receive analysis information of the speech data from the server 10 through the communication device 114 (206).

The analysis information of the speech data may include information about whether the speech data corresponds to the first speech command stored in the storage 11 of the server 10.

The analysis information of the speech data may include an intent of the speech data, a position value indicating a device to be controlled, and a target value, which is function control information.

The analysis information of the speech data may include information about the first speech command that can be matched with the speech data.

The vehicle 100 may identify whether the speech data received through the microphone 104 corresponds to the first speech command registered in the server 10 based on the analysis information (208).

The first speech command may be the pre-registered official speech command.

It can be said that the speech data received through the microphone 104 corresponding to the first speech command registered in the server 10 is that the command of the speech data received through the microphone 104 is the same expression (or content) as the command included in the first speech command registered in the server 10.

When the speech data received through the microphone 104 corresponds to the first speech command registered in the server 10, the vehicle 100 may perform operation 210, otherwise, may perform operation 214.

The vehicle 100 may output information related to the first speech command through the output device (210).

The vehicle 100 may audibly and/or visually output information related to the first speech command through the speaker 106 and/or the display device 108.

The information related to the first speech command may include function control information of the vehicle 100 based on at least one first speech command and at least one first speech command. The function control information of the vehicle 100 may include function control information of the at least one device of the vehicle 100.

The vehicle 100 may control the device of the vehicle 100 based on the first speech command (212).

The vehicle 100 may control the at least one device of the vehicle 100 based on the first speech command in response to the speech data corresponding to the first speech command registered in the server 10.

The vehicle 100 may control the output device to output information about target devices of a predetermined control setting of the vehicle 100 (214).

The vehicle 100 may audibly and/or visually output information about target devices of the predetermined control setting through the speaker 106 and/or the display device 108.

The information about target devices of the predetermined control setting may include target devices of the vehicle 100 that can be controlled based on the setting of the speech command.

The information about the target devices with the predetermined control setting may include the control operation (or a function to be controlled) to be set for each of the target devices.

The vehicle 100 may set the speech data received through the microphone 104 as the second speech command for controlling at least one of the target devices (216).

The vehicle 100 may set the speech data received through the microphone 104 as the second speech command for controlling the at least one of the target devices based on reception of the user input through the input device. For example, in response to the output of information about the target devices, the vehicle 100 may set the speech data received through the microphone 104 as the second speech command for controlling at least one device based on the user input for selecting the at least one of the target devices.

In addition to the above-described embodiment, the vehicle 100 may control the at least one device of the vehicle 100 based on the set second speech command.

Further, in addition to the above-described embodiment, the vehicle 100 may identify whether the speech data corresponds to the third speech command registered and stored in advance, based on the speech data not corresponding to the first speech command. The vehicle 100 may control the output device to output information about the target devices of the predetermined control setting of operation 214 described above based on the speech data not corresponding to the third speech command.

Further, in addition to the above-described embodiment, the vehicle 100 may identify the at least one device upon receiving a first user input for selecting at least one of the target devices in response to the output of information about the target devices. Thereafter, the vehicle 100 may control the output device to output user selection information about whether to set the speech data as the second speech command for controlling the at least one device. The vehicle 100 may set the second speech command based on reception of a second user input for setting the speech data as the second speech command for controlling the at least one device.

Figure 3A:
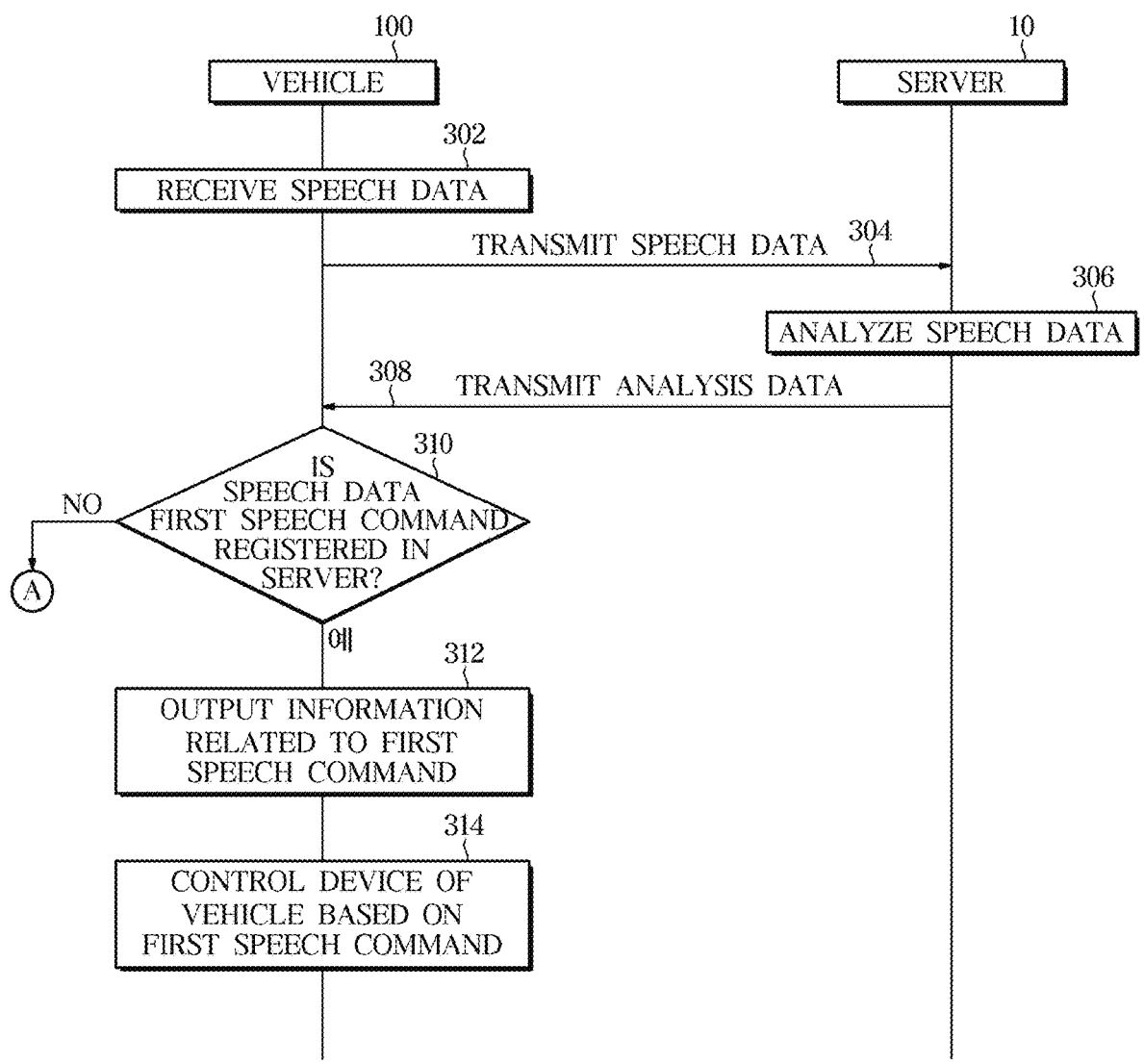
Figure 3B:
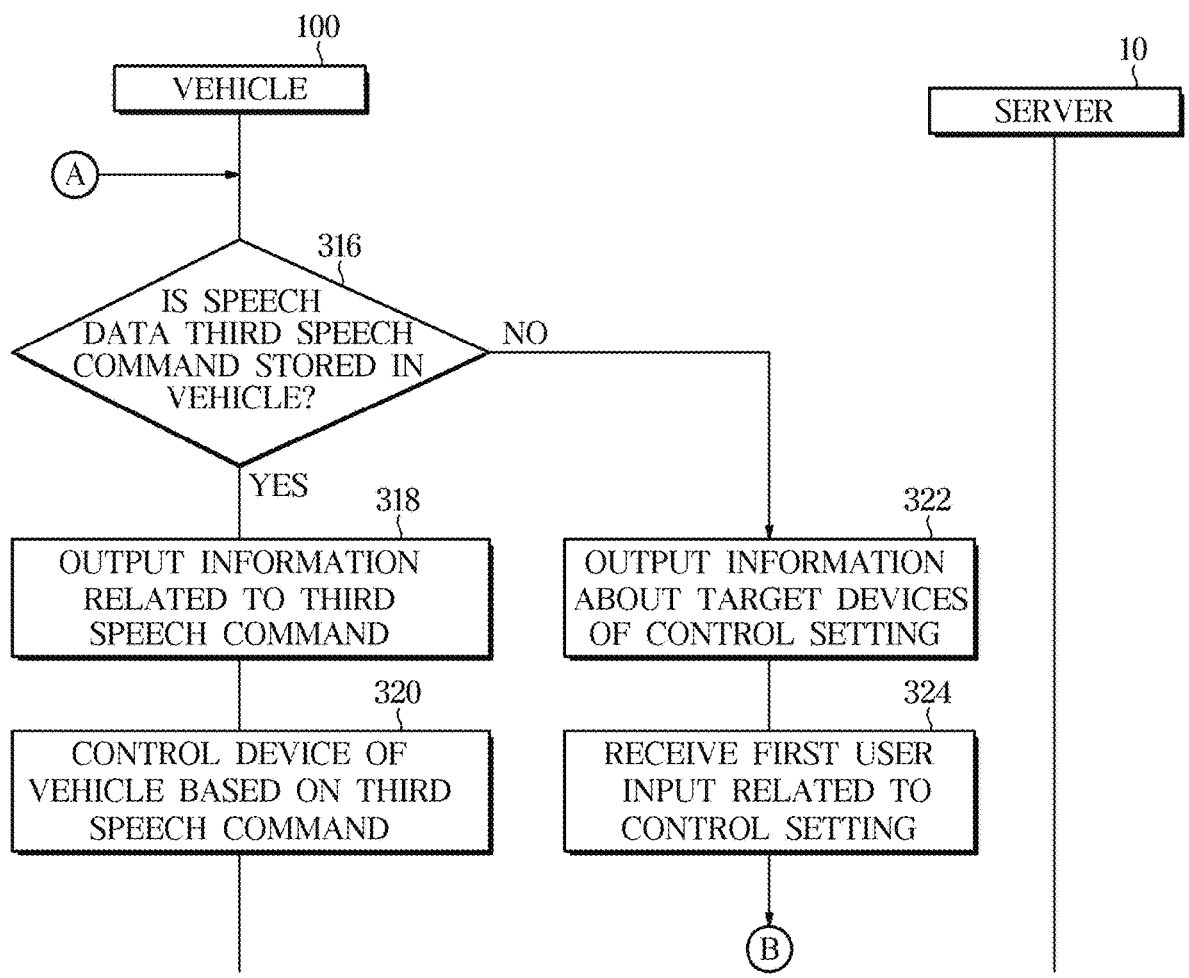

FIGS. 3A to 3C are flowcharts illustrating an operation of a vehicle according to an embodiment.

The vehicle 100 may receive the speech data of the user through the microphone 104 (302).

The vehicle 100 may transmit the speech data to the server 10 through the communication device 114 (304).

The server 10 may analyze the speech data (306).

The server 10 may receive the speech data transmitted from the vehicle 100 through the communicator 17 and may analyze the received speech data. For example, the server 10 may identify whether the received speech data corresponds to the first speech command stored in the storage 11 of the server 10.

When the server 10 receives speech data indicating "a passenger's hip is cold" from the vehicle 100, the server 10 may analyze the speech data "the passenger's hip is cold" as illustrated in Table 1 below.

TABLE 1

| Intent | cold |
| Position value | passenger seat |
| Target value | hip |

In addition, the server 10 may analyze whether the first speech commands, which are official speech commands stored in the storage 11, are matched as illustrated in Table 2 below.

TABLE 2

| | speech data | first speech commands |
| --- | --- | --- |
| Intent | cold | operation on, warm |
| Position value | passenger seat | passenger seat |
| Target value | hip | seat warmer |

The server 10 may transmit the analysis information, which is an analysis result of the speech data, to the vehicle 100 through the communicator 17 (308).

The analysis information may include information about whether the speech data corresponds to the first speech command stored in the storage 11 of the server 10.

For example, the first speech command may be the official speech command registered in advance in the server 10.

For example, when the speech data corresponds to the first speech command, it can be said that the command of the speech data is the same expression (or content) as the first speech command of the server 10.

The analysis information may include an intent of speech data, a position value indicating a device to be controlled, and a target value, which is the function control information.

The analysis information of the speech data may include information about the first speech command that can be matched with the speech data.

The vehicle 100 may identify whether the speech data corresponds to the first speech command registered in the server 10 based on the received analysis information (310).

The vehicle 100 may perform operation 312 when the speech data corresponds to the first speech command registered in the server 10, and otherwise perform operation 316.

The vehicle 100 may output information related to the first speech command through the output device (312).

The information related to the first speech command may include the function control information of the vehicle 100 based on at least one first speech command and the at least one first speech command. The function control information of the vehicle 100 may include the function control information of the at least one device of the vehicle 100.

The information related to the first speech command may include information such as the first speech command, a position of the device to be controlled of the vehicle 100 and/or a description of a control function.

The vehicle 100 may control the device of the vehicle 100 based on the first speech command (314).

The vehicle 100 may control the device of the vehicle 100 based on the first speech command in response to the speech data corresponding to the first speech command registered in the server 10.

The vehicle 100 may identify whether the speech data corresponds to the third speech command stored in the vehicle 100 (316).

For example, the third speech command may be referred to as the user-set speech command that is set by the vehicle 100 and registered in advance.

For example, when the speech data corresponds to the third speech command, it can be said that the command of the speech data is the same expression (or content) as the third speech command.

The vehicle 100 may perform operation 318 when the speech data corresponds to the third speech command registered in the vehicle 100, and otherwise perform operation 322.

The vehicle 100 may output information related to the third speech command through the output device (318).

The information related to the third speech command may include the function control information of the vehicle 100 based on the third speech command and the third speech command. The function control information of the vehicle 100 may include the function control information of the at least one device of the vehicle 100.

The information related to the third speech command may include the third speech command, the position of the device to be controlled of the vehicle 100, the description of the control function, and/or the first speech command matched with the third speech command.

The vehicle 100 may control the device of the vehicle 100 based on the third speech command (320).

The vehicle 100 may control the device of the vehicle 100 based on the third speech command in response to the speech data corresponding to the third speech command stored in the vehicle 100.

The vehicle 100 may output information about devices to be controlled through the output device (322).

The vehicle 100 may audibly and/or visually output information about the target devices of the control setting through the speaker 106 and/or the display device 108.

The information about the target devices of the control setting may include control setting target devices and at least one control operation (or the function to be controlled) to be set for each of the target devices.

The target devices of the control setting may be devices of the vehicle 100 that can be controlled by the user's speech, and may be predetermined. For example, the target devices for control setting may be selected from devices of the vehicle 100 that can be controlled with the user's speech by analyzing the speech data based on the speech recognition technology and/or the natural language recognition technology.

The at least one control operation (or the function to be controlled) to be set for each of the target devices may be predetermined. For example, the at least one control operation (or function to be controlled) to be set for each of the target devices may be selected from among at least one control operation by analyzing the speech data based on the speech recognition technology and/or the natural language recognition technology.

The vehicle 100 may receive the first user input related to control setting through the input device in response to the output of information about the target devices (324).

The first user input may be the input for selecting at least one device among the target devices and selecting the control operation of the selected at least one device.

The vehicle 100 may identify whether to receive the second user input related to the setting of the second speech command (326).

The second user input related to the setting of the second speech command may be the user input for setting the speech data as the second speech command based on the control setting of the first user input.

For example, the vehicle 100 may output information asking whether to set speech data as the second speech command for the control operation of the at least one device selected based on the control setting of the first user input through the output device.

In addition, the vehicle 100 may receive the second user input of the user through the input device in response to an output of information asking whether to set the speech data as the second speech command.

The vehicle 100 may perform operation 328 when receiving the second user input, and otherwise perform operation 334.

The vehicle 100 may set the speech data as the second speech command for the control operation of the at least one device selected based on the control setting of the first user input (328).

The vehicle 100 may transmit the information related to the second speech command to the server 10 through the communication device 114 (330).

For example, the information related to the second speech command may include the function control information of the vehicle 100 based on the second speech command and the second speech command. The function control information of the vehicle 100 may include the function control information of the at least one device of the vehicle 100.

The vehicle 100 may output setting completion information of the second speech command through the output device (332).

The vehicle 100 may output speech command guidance information of the vehicle 100 through the output device (334).

The speech command guidance information may include information related to the first speech command and/or the third speech command similar to the speech data.

The vehicle 100 may identify the first speech command and/or the third speech command similar to the speech data stored in the storage device 110 based on the control setting of the first user input in operation 324 described above, and may output the information related to the first speech command and/or the third speech command.

The vehicle 100 may control the at least one device selected based on the speech data.

The vehicle 100 may control the at least one device selected based on the speech data in response to receiving the second user input.

The vehicle 100 may identify the at least one device and the control operation of the at least one device based on the control setting of the first user input in operation 324 described above. In response to receiving the second user input, the vehicle 100 may perform the control operation of the at least one device.

Meanwhile, according to the transmission of information related to the second speech command to the server 10 through the communication device 114 in operation 330 of the vehicle 100, the server 10 may store the second speech command to the storage 11 (338).

For example, the server 10 may receive the information related to the second speech command through the communicator 17 and store the second speech command in the storage 11.

Figure 4:
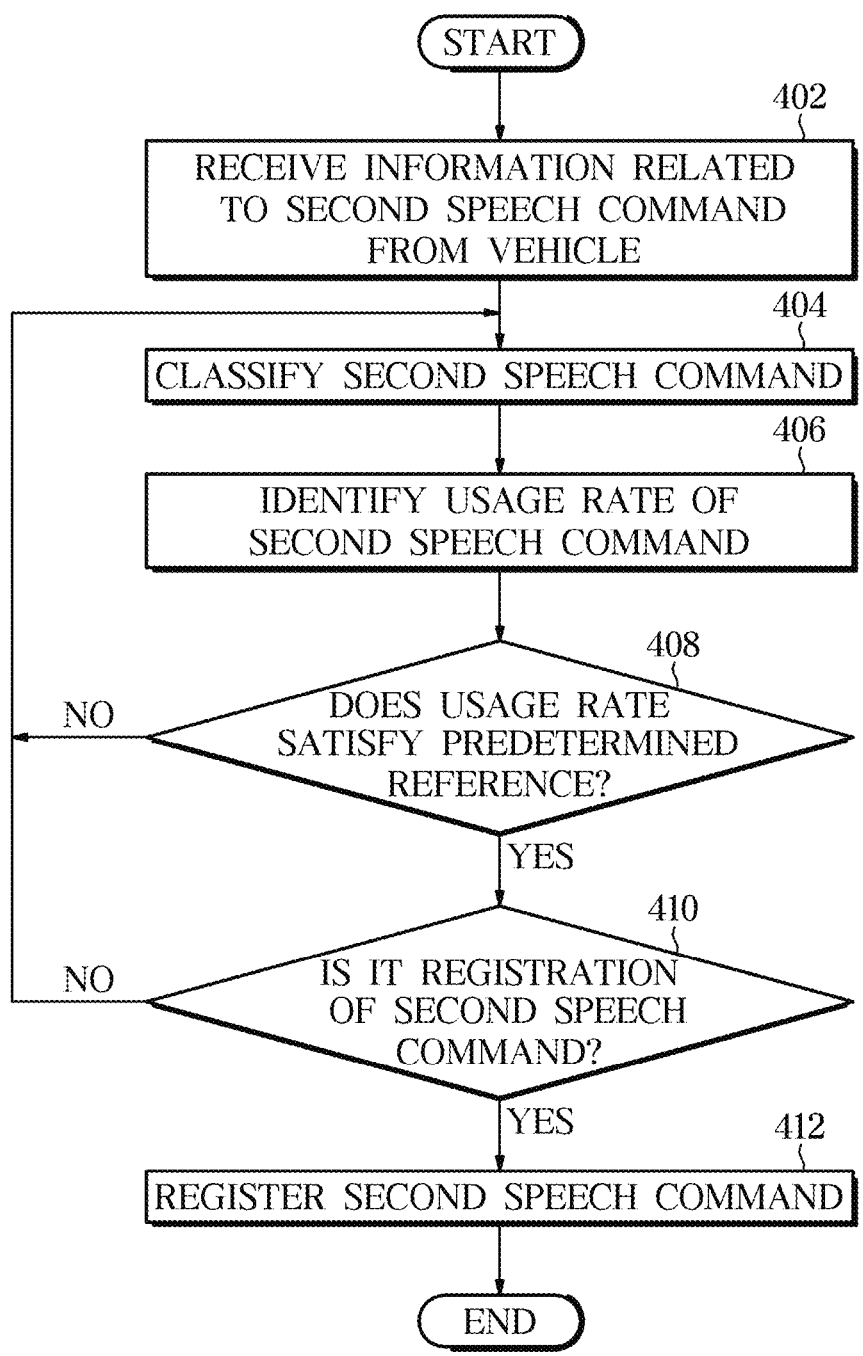
FIG. 4 is a flowchart illustrating an operation of a server according to an embodiment.

FIG. 4 is a flowchart illustrating an operation of a server according to an embodiment.

The server 10 may receive the information related to the second speech command from the vehicle 100 through the communicator 17 (402).

The server 10 may classify the second speech command (404).

The server 10 may identify the usage rate of the second speech command (406).

The server 10 may identify whether the usage rate of the second speech command satisfies the predetermined reference.

For example, when the usage rate used by the users of the plurality of vehicles communicating with the server 10 is greater than or equal to the reference rate (e.g., 10%), it may be said that the predetermined reference is satisfied.

The server 10 may perform operation 410 when the usage rate of the second speech command satisfies the predetermined reference, and otherwise perform operation 404 again.

The server 10 may identify whether to register the second speech command (410).

For example, the server 10 may identify whether the second speech command includes the abusive language, the hate speech and/or the advertisement, or the like, based on the algorithm for filtering the abusive speech, the hate speech and/or the advertisement.

When the second speech command includes the abusive language, the hate expression and/or the advertisement, the server 10 may determine not to register the second speech command.

In addition, when the second speech command does not include the abusive language, the hate expression, and/or the advertisement, the server 10 may determine to register the second speech command as the first command that is the official command.

When it is determined that the server 100 registers the second speech command, operation 412 may be performed, and otherwise, operation 404 may be performed again.

The server 10 may register the second speech command as the first command that is the official command (412).

The server 10 may register the second speech command as the first command that is the official command and store it in the storage 11.

Figure 5:
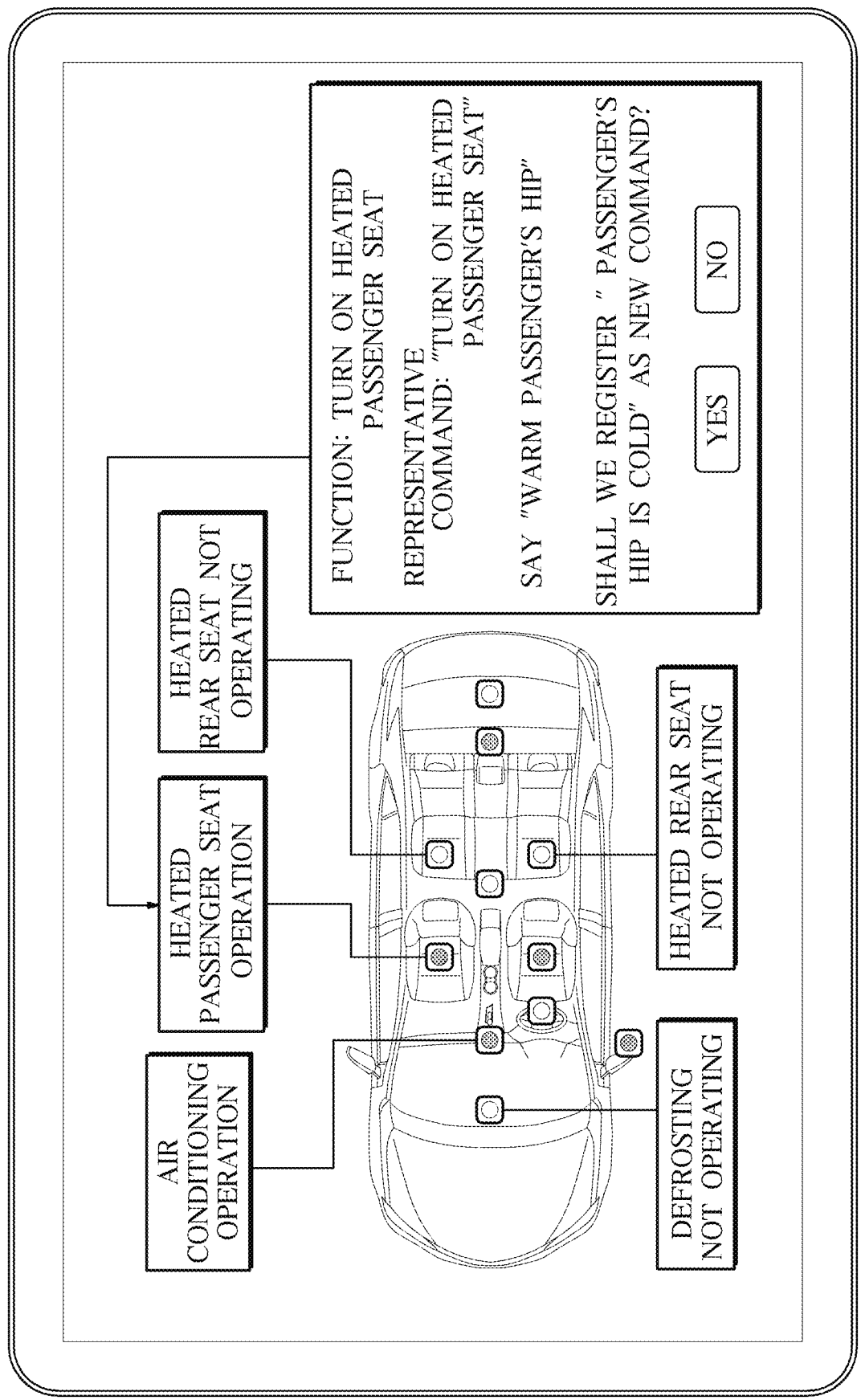
FIG. 5 is a view for describing an operation of a vehicle according to an embodiment.

FIG. 5 is a view for describing an operation of a vehicle according to an embodiment.

According to the above-described embodiment, when the user of the vehicle 100 utters "the passenger's hip is cold", the microphone of the vehicle 100 may receive the speech data according to the user's utterance and may transmit the speech data to the server 10.

The server 10 may analyze the speech data indicating "the passenger's hip is cold" as illustrated in Table 3 below.

TABLE 3

| Intent | cold |
|---|---|
| Position value | passenger seat |
| Target value | hip |

The server 10 may analyze whether the first speech commands, which are official speech commands stored in the storage 11, are matched as illustrated in Table 4 below, and may transmit the following information to the vehicle 100. Alternatively, the vehicle 100 may analyze whether the first speech commands and/or the third speech commands stored in the storage device 110 are matched as shown in Table 4 below.

TABLE 4

| | speech data | first speech commands |
|---|---|---|
| Intent | cold | operation on, warm |
| Position value | passenger seat | passenger seat |
| Target value | hip | seat warmer |

The vehicle 100 may display the following information as illustrated in FIG. 5 on a screen of the display device 108 based on the reception of the above-described analysis information from the server 10.

Position of the device to be controlled of the vehicle 100: Heated passenger seat.

Control function description: Turn on the heated passenger seat.

First speech command, which is official speech command (or also referred to as the representative speech command): Turn on the heated passenger seat.

Third speech command, which is custom speech command: Warm the passenger's hip.

Yes/No button that allows the user to select whether or not to register "the passenger's hip is cold" according to the user's utterance.

In addition, although not illustrated, based on a selection of the Yes button in the display device 108 described above, the vehicle 100 may register a second speech command "the passenger seat is cold" uttered by the user. The vehicle 100 may store "the passenger seat is cold" as the second speech command in the database 112 of the storage device 110.

For example, the vehicle 100 may store the "passenger seat is cold" in the "Turn on the heated passenger seat" group of the database 112.

The vehicle 100 may receive the intention, the position value, the target value, etc. corresponding to the speech data from the server 10 at the same time as the registration of the second speech command. Accordingly, the vehicle 100 may include "the passenger seat is cold" in the "passenger seat hips warm" group of the third database 15 of the server 10 through communication with the server 10.

On the other hand, the server 10 may monitor, that is, identify the usage rate of the third speech commands that are user-set speech commands stored in the second database 14. The third speech commands may include the second speech commands stored in the second database 14.

For example, in a group "Turn on the heated passenger seat", it may list the third speech commands with the usage rate of 10% or more. For example, in the group "Turn on the heated passenger seat", it may list the third speech commands, such as warming the passenger's hip, cold passenger seat, etc.

The server 10 may filter (exclude) the third speech command including the abusive language, the hate expression, a gambling and/or the advertisement among the listed third speech commands.

For example, the storage 11 of the server 10 may store information such as the abusive language, the hate expression, the gambling and/or the advertisement. The server 10 may filter (exclude) the third speech command including the abusive language, the hate expression, the gambling and/or the advertisement among the listed third speech commands based on a comparison with the stored information.

The server 10 may make the third speech commands other than the filtered third speech commands available to the users of other vehicles that are communicatively connected to the server 10. For example, the server 10 may store the third speech commands other than the filtered third speech commands as the first speech commands, that is, update the first database 13. Accordingly, even the user who does not directly register the speech command "the passenger seat is cold" may use the speech command "the passenger seat is cold" in order to turn on the heated passenger seat of the vehicle 100.

In addition, although not illustrated, in addition to the above-described embodiment, by using the electronic device 1000 that communicates with the server 10 and/or the vehicle 100, the user may manage the third speech command, which is the user-set speech command stored in the server 10. For example, the electronic device 1000 may be synchronized with the server 10 and/or the vehicle 100.

For example, the electronic device 1000 may execute the application program capable of registering, modifying, and/or deleting the speech command of the vehicle 100 based on the user input. The electronic device 1000 may identify, modify, and/or delete the second speech command, for example, the speech command such as "the passenger seat is cold" based on the user input through the application program.

In addition, the electronic device 1000 may receive the information related to the third speech command from the server 10 and output the information related to the listed third speech commands through the output device. Accordingly, the user may identify the information related to the third speech commands.

In addition, the electronic device 1000 may receive information related to the third speech command used by other users provided by the server 10, and may store the third speech command in the storage device 110 of the vehicle 100 so as to become the speech command usable in the vehicle 100 based on the user input.

In the vehicle and the method of controlling the vehicle according to an aspect, a learning function for customization is applied, and the speech recognition technology that can be linked with a graphical user interface (GUI) may be provided.

For example, in the vehicle and the method of controlling the vehicle, even if the speech command uttered by the user is not a preset command, it may recognize as a similar command similar to the preset command. In addition, the speech command may be registered as a command capable of performing the same function as the preset command.

In the vehicle and the method of controlling the vehicle, even users who have not registered their own speech command may receive a function of the previously registered speech command of another user.

For example, the vehicle and the method of controlling the vehicle are interlocked with an AVNT (audio, video, navigation, telematics; audio, video, navigation, telematics) device and the GUI of an application, so that the user may identify which devices of the vehicle can be controlled by the speech command and which speech commands are registered. In addition, the user may modify, delete and/or register the speech command to control the function of the vehicle.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
a communication device;
an output device;
an input device including a microphone; and
a control device connected to the communication device, the output device, and the input device, wherein the control device is configured to:
transmit speech data received through the microphone to a server through the communication device;
receive analysis information of the speech data from the server through the communication device in response to the transmission of the speech data, wherein the analysis information of the speech data includes function control information comprising an intent of the speech data, a position value indicating a device to be controlled, and a target value;
identify whether the speech data corresponds to a first speech command registered in the server as an official speech command that can be used by a plurality of vehicles including the vehicle based on the analysis information;
control the output device to output information about target devices of a predetermined control setting of the vehicle based on the speech data not corresponding to the first speech command;
set the speech data as a second speech command for controlling at least one of the target devices based on a reception of a user input through the input device; and
transmit information related to the second speech command to the server through the communication device, wherein the server comprises a first database that stores the first speech command and a second database that stores a third speech command that can be used by the vehicle, and the server is configured to:
based on receiving the information related to the second speech command, register the second speech command as the third speech command of the vehicle;
in response to receiving the information related to the second speech command from the vehicle, storing the second speech command as the third speech command in the second database;
identify a usage rate, used by the plurality of vehicles communicating with the server, of the second speech command; and
when the usage rate is greater than or equal to a reference rate, store the second speech command as the first speech command that is the official speech command in the first database.

2. The vehicle according to claim 1, wherein the control device is further configured to:
output information related to the first speech command through the output device based on the speech data corresponding to the first speech command; and
control the target devices of the vehicle based on the first speech command.

3. The vehicle according to claim 1, further comprising:
a storage device;
wherein the control device is configured to:
based on the speech data not correspond to the first speech command, identify whether the speech data is registered in advance and corresponds to the third speech command stored in the storage device; and
control the output device to output information about the target devices of the predetermined control setting based on the speech data not corresponding to the third speech command.

4. The vehicle according to claim 3, wherein the control device is configured to:
output information related to the third speech command through the output device based on the speech data corresponding to the third speech command; and
control the target devices of the vehicle based on the third speech command.

5. The vehicle according to claim 1, wherein the control device is configured to:
receive a first user input through the input device in response to the output of the information about the target devices;
identify the at least one of the target devices based on the reception of the first user input; and
in response to the identification of the at least one target device, control the output device to output user selection information about whether to set the speech data as the second speech command for controlling the at least one target device.

6. The vehicle according to claim 5, wherein the control device is configured to:
receive a second user input through the input device in response to the output of the user selection information; and
set the speech data as the second speech command for controlling the at least one target device based on the second user input.

7. The vehicle according to claim 1, wherein the control device is configured to control the at least one target device based on the second speech command.

8. The vehicle according to claim 1, wherein the control device is configured to transmit information related to the second speech command to the server through the communication device.

9. A method of controlling a vehicle comprising:
transmitting, by a control device, speech data received through a microphone of an input device of the vehicle to a server;
receiving, by the control device, analysis information of the speech data from the server in response to the transmission of the speech data, the analysis information of the speech data including function control information comprising an intent of the speech data, a position value indicating a device to be controlled, and a target value;
identifying, by the control device, whether the speech data corresponds to a first speech command registered in the server as an official speech command that can be used by a plurality of vehicle including the vehicle based on the analysis information;
controlling, by the control device, an output device of the vehicle to output information about target devices of a predetermined control setting of the vehicle based on the speech data not corresponding to the first speech command;
setting, by the control device, the speech data as a second speech command for controlling at least one of the target devices based on a reception of a user input, and
transmitting information related to the second speech command to the server through a communication device,
wherein the server comprises a first database that stores the first speech command and a second database that stores a third speech command that can be used by the vehicle;
receiving, by the server, the information related to the second speech command, and based on the information related to the second speech command received, register the second speech command as the third speech command of the vehicle;
in responding to receiving the information related to the second speech command from the vehicle, storing, by the server, the second speech command as the third speech command in the second database,
identifying, by the server, a usage rate, used by the plurality of vehicles communicating with the server, of the second speech command; and
when the usage rate is greater than or equal to a reference rate, storing, by the server, the second speech command as the first speech command that is the official speech command in the first database.

10. The method according to claim 9, further comprising:
outputting, by the control device, information related to the first speech command through the output device based on the speech data corresponding to the first speech command; and
controlling, by the control device, the target devices of the vehicle based on the first speech command.

11. The method according to claim 9, wherein the controlling of the output device of the vehicle to output the information about the target devices of the predetermined control setting of the vehicle comprises:
based on the speech data not corresponding to the first speech command, identifying whether the speech data is registered in advance and corresponds to the third speech command stored in a storage device; and controlling the output device to output information about the target devices of the predetermined control setting based on the speech data not corresponding to the third speech command.

12. The method according to claim 11, further comprising:
outputting, by the control device, information related to the third speech command through the output device based on the speech data corresponding to the third speech command; and
controlling, by the control device, the target devices of the vehicle based on the third speech command.

13. The method according to claim 9, wherein the setting of the speech data as the second speech command for controlling the at least one of the target devices comprises:
receiving a first user input through the input device in response to the output of the information about the target devices;
identifying the at least one of the target devices based on the reception of the first user input; and
in response to the identification of the at least one target device, controlling the output device to output user selection information about whether to set the speech data as the second speech command for controlling the at least one target device.

14. The method according to claim 13, wherein the setting of the speech data as the second speech command for controlling the at least one of the target devices comprises:
receiving a second user input in response to the output of the user selection information; and
setting the speech data as the second speech command for controlling the at least one target device based on the second user input.

15. The method according to claim 9, further comprising:
controlling, by the control device, the at least one target device based on the second speech command.

16. The method according to claim 9, further comprising:
transmitting, by the control device, information related to the second speech command to the server.

* * * * *

UNITED STATES PATENT AND TRADEMARK OFFICE
CERTIFICATE OF CORRECTION

PATENT NO. : 12,128,839 B2  
APPLICATION NO. : 17/491909  
DATED : October 29, 2024  
INVENTOR(S) : Park et al.

Page 1 of 1

It is certified that error appears in the above-identified patent and that said Letters Patent is hereby corrected as shown below:

In the Claims

In Column 18, in Claim 9, Line 20, delete first occurrence "of vehicle" and insert -- of vehicles --.

Signed and Sealed this  
Third Day of December, 2024

Katherine Kelly Vidal  
*Director of the United States Patent and Trademark Office*